(12) United States Patent
Zhu

(10) Patent No.: US 10,189,218 B2
(45) Date of Patent: Jan. 29, 2019

(54) THERMAL COMPOSITE MATERIAL REPAIR UTILIZING VACUUM COMPRESSION

(71) Applicant: The Boeing Company, Chicago, IL (US)

(72) Inventor: Alex Zhu, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 15/132,614

(22) Filed: Apr. 19, 2016

(65) Prior Publication Data

US 2017/0297280 A1    Oct. 19, 2017

(51) Int. Cl.
  *B29C 33/68* (2006.01)
  *B29C 35/02* (2006.01)
  (Continued)

(52) U.S. Cl.
  CPC .............. *B29C 73/02* (2013.01); *B29C 33/68* (2013.01); *B29C 35/02* (2013.01); *B29C 35/0266* (2013.01); *B29C 43/10* (2013.01); *B29C 43/52* (2013.01); *B29C 70/745* (2013.01); *B29C 73/12* (2013.01); *B29C 73/30* (2013.01); *B64F 5/40* (2017.01); *B29C 37/0075* (2013.01); *B29C 2043/3657* (2013.01);
  (Continued)

(58) Field of Classification Search
  CPC ..... B29C 33/68; B29C 35/02; B29C 35/0266; B29C 37/0075; B29C 43/10; B29C 43/12; B29C 2043/3644; B29C 2043/3657; B29C 2043/3671; B29C 70/74; B29C 70/745; B29C 73/02; B29C 73/10; B29C 73/12; B29C 73/30; B29C 73/32; B29C 73/34; B29C 2791/006; B29K 2063/00; B29K 2101/10; B29K 2827/12; B29K 2883/00; B29K 2995/0013; B29L 2031/3076; B64F 5/40
  See application file for complete search history.

(56) References Cited

U.S. PATENT DOCUMENTS 5,814,175 A * 9/1998 Rau ...................... B29C 66/71
                                                    156/157
6,149,749 A * 11/2000 McBroom ............... B29C 73/02
                                                    156/87
(Continued)

FOREIGN PATENT DOCUMENTS

EP          1782942 A1 *  5/2007  ............. B29C 73/10

*Primary Examiner* — Michael A Tolin
(74) *Attorney, Agent, or Firm* — Duft & Bornsen, PC

(57) ABSTRACT

Thermal curing of a potting material within a hole in a surface of a composite material is described utilizing a flexible vacuum compression device that includes a chemical-based heating pack. The vacuum compression device includes an internal compartment within a cavity that retains the chemical-based heating pack, and a vacuum port having a passage into the cavity. An end of the vacuum compression device includes an interface that forms an air-tight seal between the cavity and the surface when applied to a surface of the composite material. Drawing a vacuum via the vacuum port collapses the vacuum compression device and positions the chemical-based heating pack proximate to the surface, enabling heat from the chemical-based heating pack to thermally cure the potting material.

22 Claims, 5 Drawing Sheets

(51) Int. Cl.
*B29C 70/74* (2006.01)
*B29C 73/02* (2006.01)
*B29C 73/12* (2006.01)
*B29C 73/30* (2006.01)
*B64F 5/40* (2017.01)
*B29C 43/10* (2006.01)
*B29C 43/52* (2006.01)
*B29K 63/00* (2006.01)
*B29C 43/36* (2006.01)
*B29C 37/00* (2006.01)

(52) U.S. Cl.
CPC .... *B29C 2791/006* (2013.01); *B29K 2063/00* (2013.01); *B29K 2827/12* (2013.01); *B29K 2883/00* (2013.01); *B29K 2995/0013* (2013.01)

(56) References Cited

U.S. PATENT DOCUMENTS

| | | | |
|---|---|---|---|
| 6,270,603 B1 | 8/2001 | Westerman et al. | |
| 7,306,450 B2 * | 12/2007 | Hanson | B29C 70/44 156/245 |
| 8,986,479 B2 * | 3/2015 | Evens | B29C 73/10 156/285 |
| 2007/0095457 A1 | 5/2007 | Keller et al. | |
| 2013/0056131 A1 * | 3/2013 | Whitworth | B29C 37/006 156/64 |

\* cited by examiner

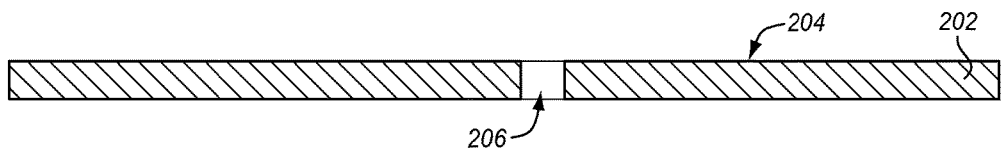
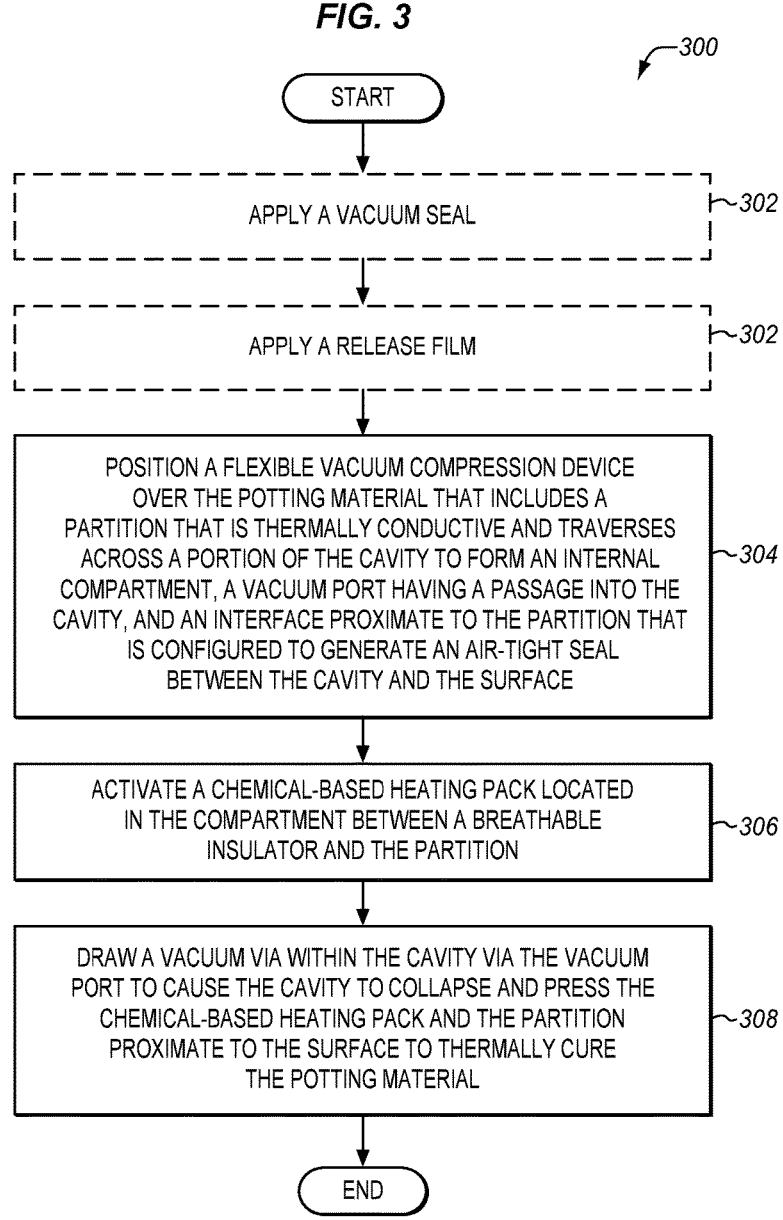

THERMAL COMPOSITE MATERIAL REPAIR UTILIZING VACUUM COMPRESSION

FIELD

This disclosure relates to the field of composite material repair and in particular, to repairing composite materials utilizing thermally cured materials.

BACKGROUND

Composite panels of laminated materials are increasingly used in aircraft manufacturing due to their light weight and high strength. Large scale composite structures are typically fabricated from smaller composite panels that are fastened together. The smaller composite panels are aligned with each other into their final layout, drilled during the manufacturing process, and then fastened together.

In some cases, errors may occur during the drilling process that results in holes being drilled in the wrong position and/or using the wrong diameter drill bit. When a drilling error occurs, the hole in the composite panel is repaired using an epoxy potting material that is deposited into the hole, followed by a thermal curing process. The panel may then be re-drilled in the correct location and/or with the correct diameter drill bit.

During a thermal curing process, the temperature of the panel around the potting material is controlled to a particular target temperature, which may depend on the type of potting material. Typically the curing process includes the use of Infra-Red (IR) lamps that are positioned around the cure site. However, problems may arise if the cure site is overheated due to operator error, a shift in the placement of the IR lamps after setup, etc. Overheating the cure site may cause scorching or burning of the panel, which then entails additional repairs to the composite panel or in extreme cases, irreparable damage to the composite panel. Therefore, there is a need for providing thermal curing solutions that are more reliable and less prone to accidentally damaging the composite panels during the repair process.

SUMMARY

Embodiments described herein provide systems and a method for thermally curing a potting material within a hole in a surface of a composite material utilizing a flexible vacuum compression device that includes a chemical-based heating pack. During operation, the flexible vacuum compression device is located proximate to the potting material, and a vacuum is drawn in the device. The vacuum collapses the device and presses the chemical-based heating pack proximate to the potting material in the hole, providing a controlled temperature during a thermal curing process for the potting material that is more reliable and consistent.

One embodiment comprises a flexible vacuum compression device for thermally curing a potting material within a hole in a surface of a composite material. The flexible vacuum compression device includes a first end that is closed, a second end opposite the first end that is open to form a cavity between the first end and the second end, where the second end includes an interface that generates an air tight seal when applied to the surface. The flexible vacuum compression device further includes a partition that traverses at least partially across the cavity to form a compartment within the cavity, and a vacuum port. The vacuum port has a passage through the first end and into the cavity. A breathable insulator is disposed within the compartment, and a chemical-based heating pack is disposed between the breathable insulator and the partition. A bottom surface of the partition includes a breathable pattern that, upon application of a vacuum source to the vacuum port, draws a vacuum within the cavity to cause the cavity to collapse and press the chemical-based heating pack and the partition proximate to the surface to thermally cure the potting material.

In an embodiment, the breathable insulator and/or the chemical-based heating pack are removable from the compartment.

In an embodiment, the partition is thermally conductive to allow a heat transfer from the chemical-based heating pack to the potting material.

In an embodiment, the flexible vacuum compression device is formed from silicone rubber.

In an embodiment, a removable release film is disposed between the interface and the surface of the composite material.

In an embodiment, the removable release film comprises Fluorinated Ethylene Propylene (FEP).

In an embodiment, an exothermic material utilized for the chemical-based heating pack is selected to reach a target temperature of approximately 200 degrees Fahrenheit.

In an embodiment, the breathable pattern comprises a pattern of holes that allow a vacuum to be drawn within the cavity to cause the chemical-based heating pack and the partition to be pressed towards and proximate to the surface to thermally cure the potting material.

In an embodiment, a vacuum seal is disposed on a back surface of the composite material proximate to the hole that is configured to form an air tight seal.

Another embodiment comprises a method for thermally curing a potting material within a hole in a surface of a composite material. The method comprises positioning a flexible vacuum compression device over the potting material that includes a partition that is thermally conductive and traverses across a portion of the cavity to form an internal compartment, a vacuum port having a passage into the cavity, and an interface proximate to the partition that is configured to generate an air-tight seal between the cavity and the surface. The method further comprises activating a chemical-based heating pack located in the compartment between a breathable insulator and the partition, and drawing a vacuum within the cavity via the vacuum port to cause the cavity to collapse and press the chemical-based heating pack and the partition proximate to the surface to thermally cure the potting material.

Another embodiment comprises a flexible vacuum compression device for thermally curing a potting material within a hole in a surface of a composite material. The flexible vacuum compression device includes a partition that is thermally conductive and traverses across a portion of a cavity to form an internal compartment within the cavity, a vacuum port having a passage into the cavity, and an interface proximate to the partition that is configured to generate an air-tight seal between the cavity and the surface. A removable breathable insulator is located within the interior compartment, and a removable chemical-based heating pack is located between the breathable insulator and the partition. A bottom surface of the partition proximate to the surface includes a grid pattern that, upon application of a vacuum source to the vacuum port, draws a vacuum within the cavity to deflate the cavity and press the chemical-based heating pack and the partition against the hole to thermally cure the potting material.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 2 illustrates a composite material that includes a hole through a surface of the composite material in an exemplary embodiment.

FIG. 3 is a flow chart of a method for thermally curing a potting material within a hole in a surface of a composite material in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
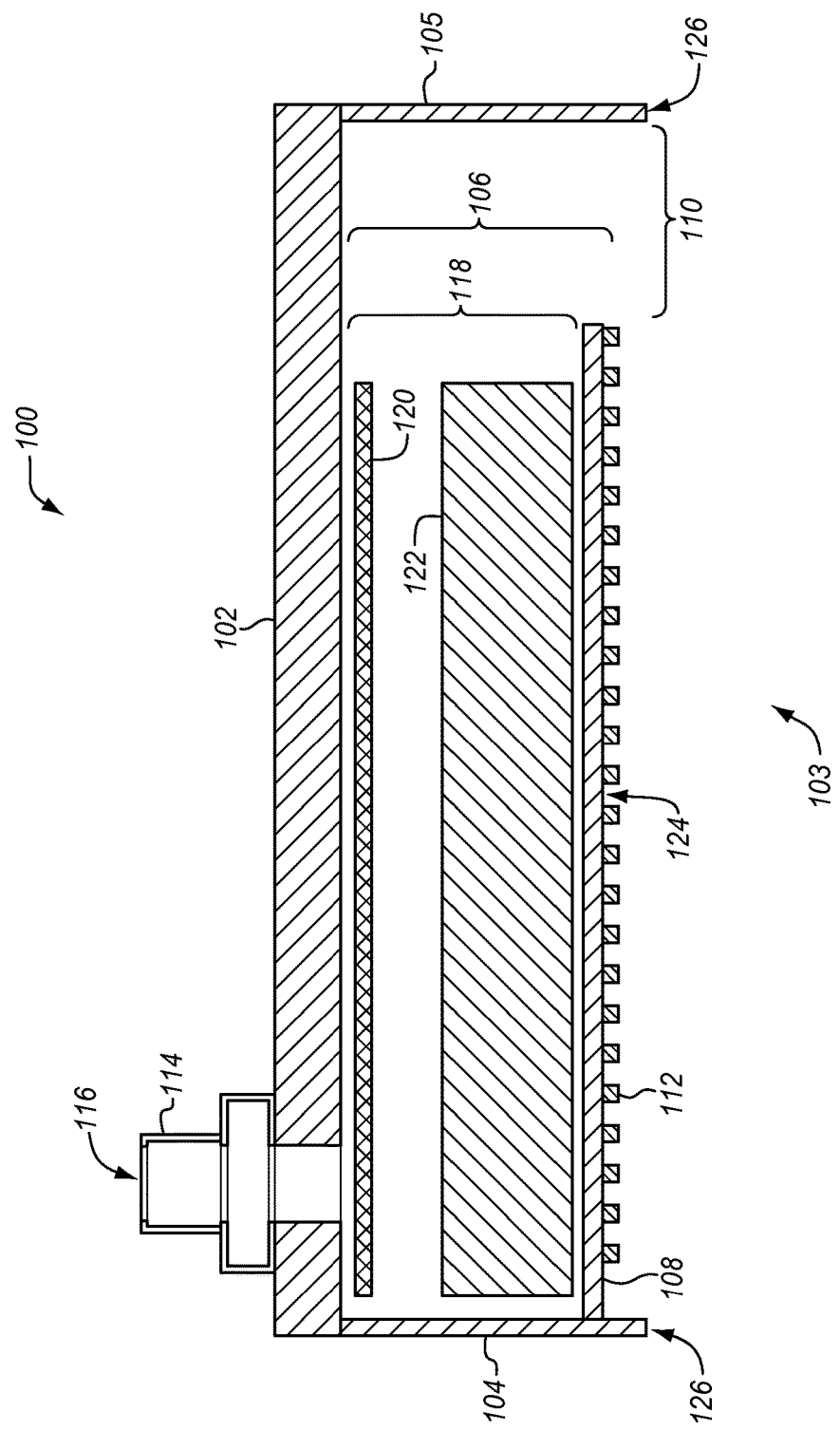
FIG. 1 illustrates a cross-section of a flexible vacuum compression device in an exemplary embodiment.

FIG. 1 illustrates a cross-section of a flexible vacuum compression device 100 in an exemplary embodiment. Device 100 may be used in the embodiments described herein to provide a compact, portable, thermal curing solution for repairing holes in composite materials. For instance, device 100 may be used during the assembly process of an aircraft to repair a hole in a composite panel that was drilled incorrectly.

In this embodiment, device 100 includes a first end 102 that is closed, and a second end 103 that opposes first end 102 and is open. A pair of side walls 104-105 extend from first end 102 towards second end 103 to create a cavity 106 within device 100. Device 100 may be formed from a flexible material, such as silicone rubber. Second end 103 includes an interface 126 that forms an air-tight seal when second end 103 is applied to a surface, such as a surface of a composite material.

Although device 100 is illustrated as a cross-section in FIG. 1, device 100 is a 3-dimensional form that may be circular, square, rectangular, etc., as a matter of design choice. For instance, if device 100 is generally circular in shape, then first end 102 may be in the form of a circular closed end with side walls 104-105 forming a circular midsection for device 100. If device 100 is generally square in shape, then first end 102 may be in the form of a square closed end with side walls 104-105 forming a square midsection for device 100. If device 100 is generally rectangular in shape, then first end 102 may be in the form of a rectangular closed end with side walls 104-105 forming a rectangular midsection for device 100.

In this embodiment, device 100 also includes a partition 108 that at least partially traverses across cavity 106. Partition 108 extends from side wall 104 towards side wall 105, forming an opening 110 that is proximate to second end 103 and a compartment 118 within cavity 106. Opening 110 may be used in some embodiments to remove and replace items from within compartment 118, such as heating packs and/or thermal insulators. Partition 108 may be formed from a thermally conductive material in some embodiments.

In some embodiments, partition 108 may extend from side wall 104 all the way across second end 103 to side wall 105 when items are not removable from compartment 118. Partition 108 of device 100 includes a breathable pattern 112 along a bottom surface 124, which allows cavity 106 to be placed under vacuum when interface 126 is placed against a surface, such as a surface of a composite material during a repair process. Pattern 112 may be indentations in bottom surface 124, extrusions from bottom surface 124, holes through partition 108, or combinations thereof.

A vacuum port 114 is located at first end 102, and has a passage 116 that traverses through first end 102 into cavity 106. Vacuum port 114 may be connected to a vacuum source (not shown) to enable a vacuum to be drawn within cavity 106. This will be discussed in more detail later.

A breathable insulator 120 is located in compartment 118 and is proximate to passage 116 of vacuum port 114. Breathable insulator 120 may be formed from Airweave N10 or a similar material that is thermally insulating and yet is able to breathe to allow air to be drawn from cavity 106. Breathable insulator 120 may be removable and/or replaceable in some embodiments utilizing opening 110 in second end 103 of device 100. Breathable insulator 120 may be used to thermally insulate a chemical-based heating pack 122 from first end 102, preventing heat loss out of first end 102.

Heating pack 122 is located between insulator 120 and partition 108 within compartment 118, and may utilize an exothermic material to generate heat, such as Sodium Acetate or Sodium Permanganate. When activated, heating pack 122 generates thermal energy at a target temperature (e.g., 200 degrees Fahrenheit (F)), to allow for thermal curing of an epoxy potting material used to fill a hole in the surface of a composite material.

FIG. 2 illustrates a composite material 202 (e.g., a composite panel used for assembling large scale composite structures for an aircraft) that includes a hole 206 through a surface 204 of composite material 202 in an exemplary embodiment. Hole 206 may be drilled through composite material 202 by accident, being the result of an error in a drilling process.

Figure 4:
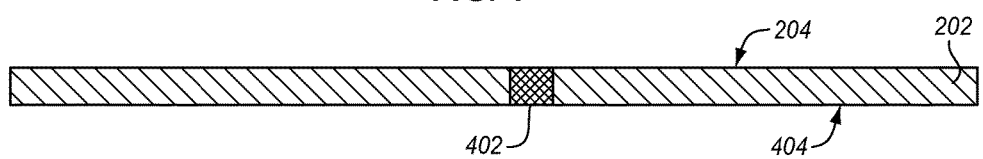
FIG. 4 illustrates a composite material that includes an epoxy potting material applied to a hole in an exemplary embodiment.

Consider that an operator wishes to begin a process to repair hole 206 in composite material 202. FIG. 3 is a flow chart of a method 300 for thermally curing a potting material within a hole in a surface of a composite material in an exemplary embodiment. The steps of method 300 will be discussed with respect to device 100, although method 300 may apply to other devices not shown. Method 300 may include other steps not shown, and the steps may be performed in an alternate order. To begin the repair process, an operator applies an epoxy potting material to hole 206. FIG. 4 illustrates composite material 202 that includes an epoxy potting material 402 applied to hole 206 in an exemplary embodiment.

Figure 5:
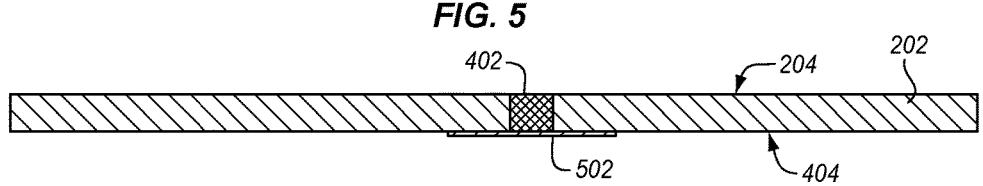
FIG. 5 illustrates a vacuum patch applied to a surface of a composite material that is proximate to a hole in an exemplary embodiment.

In some embodiments, the operator may apply a vacuum seal to surface 404 to prevent air from being drawn through hole 206 when a vacuum is applied around hole 206 (see optional step 302 of FIG. 3). FIG. 5 illustrates a vacuum seal 502 applied to surface 404 proximate to hole 206 in an exemplary embodiment. Vacuum seal 502 forms an air-tight seal around hole 206 along surface 404.

Figure 6:
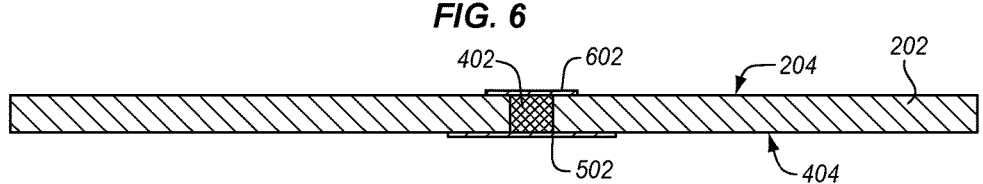
FIG. 6 illustrates a release film applied to a surface of a composite material that is proximate to a hole in an exemplary embodiment.

In other embodiments, the operator may apply a release film to surface 204 around hole 206 to prevent potting material 402 from directly contacting device 100 during the repair process (see optional step 304 of FIG. 3). FIG. 6 illustrates a release film 602 applied to surface 204 proximate to hole in an exemplary embodiment. In some embodiments, release film 602 may comprise Fluorinated Ethylene Propylene (FEP). After the repair process is complete, both release film 602 and vacuum patch 502 are removed from composite material 202.

Figure 7:
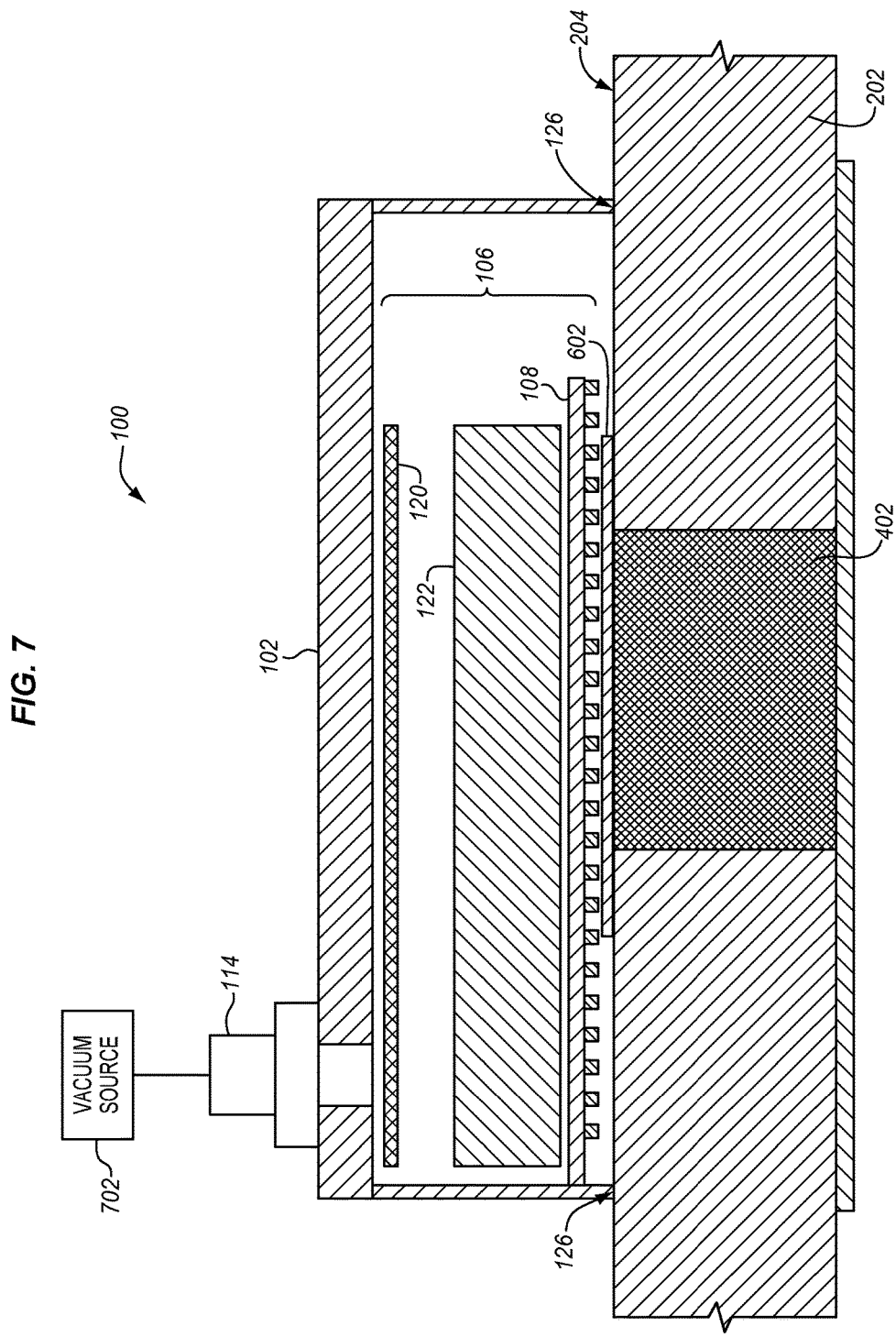
FIG. 7 illustrates the vacuum compression device of FIG. 1 positioned proximate to potting material that fills a hole in an exemplary embodiment.
Figure 8:
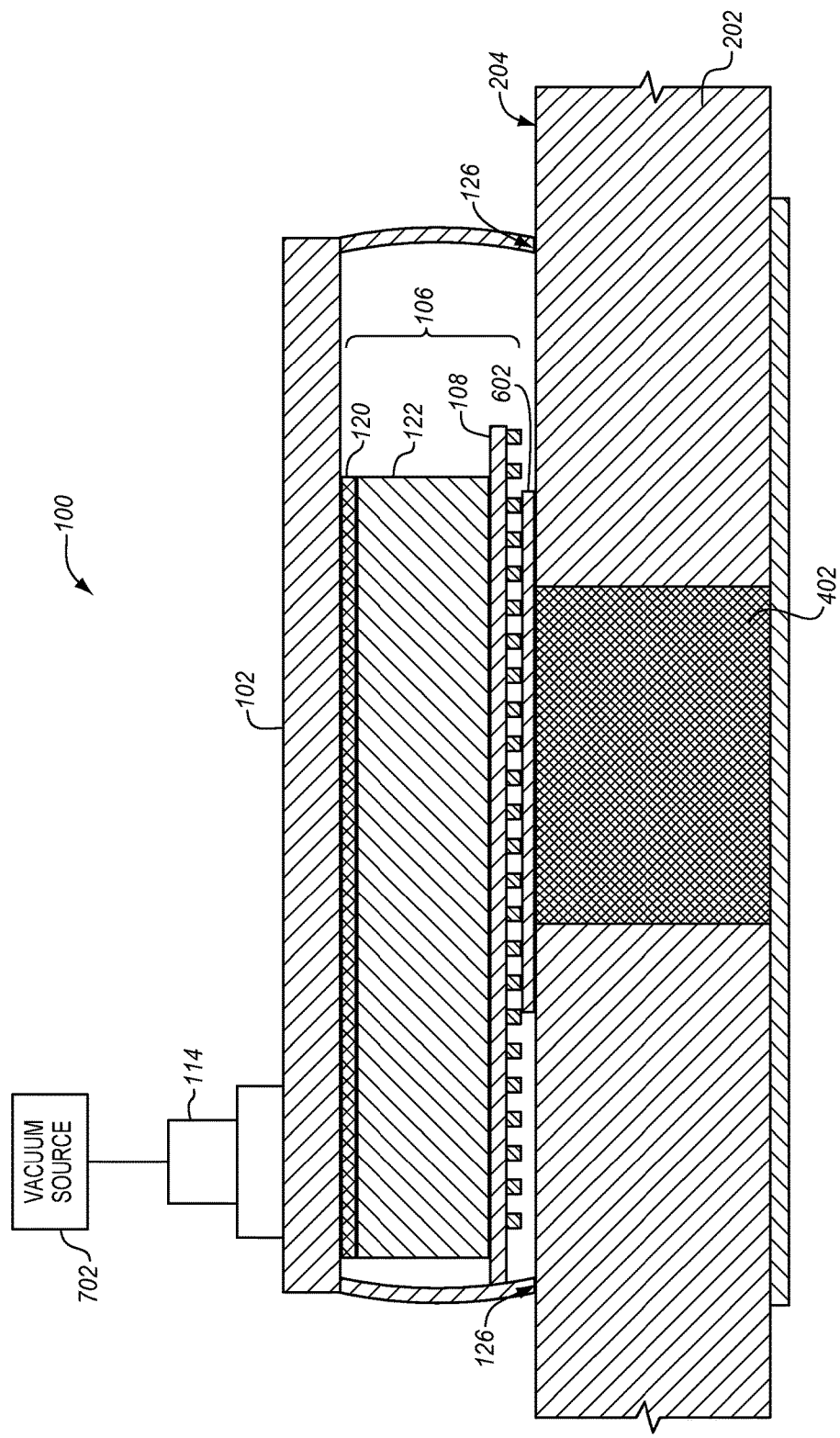
FIG. 8 illustrates the vacuum compression device of FIG. 1 after an internal cavity has collapsed due to the application of a vacuum to the device an exemplary embodiment.

Device 100 is positioned proximate to potting material 402 in hole 206 (see step 302 of FIG. 3). FIG. 7 illustrates device 100 positioned proximate to potting material 402 in an exemplary embodiment. Heating pack 122 is activated (see step 304), and a vacuum is drawn on vacuum port 114 (e.g., utilizing a vacuum source 702) to cause cavity 106 of device 100 to collapse. As air is removed from cavity 106, the pressure differential between cavity 106 and atmosphere causes cavity 106 to collapse, which forces first end 102 towards composite material 202, pressing heating pack 122 and partition 108 proximate to surface 204 to thermally cure potting material 402 (see step 306 of FIG. 3). FIG. 8 illustrates device 100 after cavity 106 is collapsed due to the application of a vacuum to vacuum port 114 in an exemplary embodiment. Heating pack 122 and partition 108 are pressed by device 100 proximate to potting material 402, allowing a heat transfer from heat pack 122 through partition 108 into potting material 402. Vacuum source 702 may continue to draw a vacuum on device 100, maintaining the collapsed state of device 100. Breathable insulator 120, which is sandwiched between first end 102 and heating pack 122, prevents heat loss from device 100 during the thermal curing process. Breathable insulator 120, even when compressed, still allows air to be drawn from cavity 106 into vacuum port 114.

After an appropriate amount of time has passed for thermally curing potting material 402, vacuum source 702 is removed, and device 100 is removed from composite material 202. Breathable insulator 120 and/or heating pack 122 may be replaced to render device 100 ready for another repair process.

Device 100 allows for the performance of a thermal curing process for composite material repair that is less prone to accidentally damaging the composite materials due to overheating. The use of a chemical-based heating pack allows for a more accurate control of the temperatures applied to the potting materials used to repair composite materials, thereby eliminating IR heating lamps which may be used incorrectly. Further, device 100 is highly portable and easily moved from one repair site to another.

Although specific embodiments were described herein, the scope is not limited to those specific embodiments. Rather, the scope is defined by the following claims and any equivalents thereof.

The invention claimed is:

1. An apparatus comprising:
a flexible vacuum compression device for thermally curing a potting material within a hole in a surface of a composite material, the flexible vacuum compression device including:
a first end that is closed;
a second end opposite the first end that is open to form a cavity between the first end and the second end, wherein the second end includes an interface that is configured to generate an air tight seal when applied to the surface;
a partition, which extends from and is connected to a side wall of the flexible vacuum compression device, that traverses at least partially across the cavity to form a compartment within the cavity; and
a vacuum port having a passage through the first end and into the cavity;
a breathable insulator disposed within the compartment; and
a chemical-based heating pack disposed between the breathable insulator and the partition;
wherein a bottom surface of the partition includes a breathable pattern that, upon application of a vacuum source to the vacuum port, draws a vacuum within the cavity to cause the cavity to collapse and press the chemical-based heating pack and the partition proximate to the surface to thermally cure the potting material.

2. The apparatus of claim 1 wherein:
at least one of the breathable insulator and the chemical-based heating pack are removable from the compartment.

3. The apparatus of claim 1 wherein:
the partition is thermally conductive to allow a heat transfer from the chemical-based heating pack to the potting material.

4. The apparatus of claim 1 wherein:
the flexible vacuum compression device is formed from silicone rubber.

5. The apparatus of claim 1 further comprising:
a removable release film disposed between the partition and the surface of the composite material.

6. The apparatus of claim 5 wherein:
the removable release film comprises Fluorinated Ethylene Propylene (FEP).

7. The apparatus of claim 1 wherein:
an exothermic material utilized for the chemical-based heating pack is selected to reach a target temperature of approximately 200 degrees Fahrenheit.

8. The apparatus of claim 1 wherein:
the breathable pattern comprises a pattern of holes that allow a vacuum to be drawn within the cavity to cause the chemical-based heating pack and the partition to be pressed towards and proximate to the surface to thermally cure the potting material.

9. The apparatus of claim 1 further comprising:
a vacuum seal disposed on a back surface of the composite material proximate to the hole that is configured to form an air tight seal.

10. An apparatus comprising:
a flexible vacuum compression device, having a cavity, for thermally curing a potting material within a hole in a surface of a composite material, the flexible vacuum compression device including:
 a partition, which extends from and is connected to a side wall of the flexible vacuum compression device, that is thermally conductive and traverses across a portion of the cavity to form an internal compartment within the cavity;
 a vacuum port having a passage into the cavity; and
 an interface proximate to the partition that is configured to generate an air-tight seal between the cavity and the surface;
a removable breathable insulator within the interior compartment;
a removable chemical-based heating pack between the breathable insulator and the partition;
wherein a bottom surface of the partition that is proximate to the surface includes a grid pattern that, upon application of a vacuum source to the vacuum port, draws a vacuum within the cavity to deflate the cavity and press the removable chemical-based heating pack and the partition proximate to the hole to thermally cure the potting material.

11. The apparatus of claim 10 wherein:
the flexible vacuum compression device is formed from silicone rubber.

12. The apparatus of claim 10 further comprising:
a removable release film disposed between the partition and the surface of the composite material.

13. The apparatus of claim 12 wherein:
the removable release film comprises Fluorinated Ethylene Propylene (FEP).

14. The apparatus of claim 10 wherein:
an exothermic material utilized for the removable chemical-based heating pack is selected to reach a target temperature of approximately 200 degrees Fahrenheit.

15. The apparatus of claim 10 further comprising:
a vacuum seal disposed on a back surface of the composite material proximate to the hole that is configured to form an air tight seal.

16. A method for thermally curing a potting material within a hole in a surface of a composite material, the method comprising:
 providing the apparatus of claim 1, the partition being thermally conductive and the compartment being located between the first end of the flexible vacuum compression device and the partition;
 positioning the flexible vacuum compression device over the potting material such that the interface generates an air-tight seal between the cavity of the flexible vacuum compression device and the surface;
 activating the chemical-based heating pack, the chemical-based heating pack being located in the compartment and between the breathable insulator and the partition; and
 drawing a vacuum within the cavity of the flexible vacuum compression device via the vacuum port to cause the cavity to collapse and press the chemical-based heating pack and the partition proximate to the surface to thermally cure the potting material.

17. The method of claim 16 wherein:
the partition is thermally conductive to allow a heat transfer from the chemical-based heating pack to the potting material.

18. The method of claim 16 wherein:
the flexible vacuum compression device is formed from silicone rubber.

19. The method of claim 16 further comprising:
applying a removable release film to the surface prior to positioning the flexible vacuum compression device.

20. The method of claim 19 wherein:
the removable release film comprises Fluorinated Ethylene Propylene (FEP).

21. The method of claim 16 wherein:
an exothermic material utilized for the chemical-based heating pack is selected to reach a target temperature of approximately 200 degrees Fahrenheit upon activation.

22. The method of claim 16 further comprising:
applying a vacuum seal on a back surface of the composite material proximate to the hole to form an air tight seal.

* * * * *